United States Patent
Miyakawa

(10) Patent No.: US 11,054,723 B2
(45) Date of Patent: Jul. 6, 2021

(54) ILLUMINATION DEVICE

(71) Applicant: CANON KABUSHIKI KAISHA, Tokyo (JP)

(72) Inventor: Toshiki Miyakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/871,563

(22) Filed: May 11, 2020

(65) Prior Publication Data

US 2020/0363700 A1 Nov. 19, 2020

(30) Foreign Application Priority Data

May 17, 2019 (JP) .............................. JP2019-093735

(51) Int. Cl.

| | |
|---|---|
| *F21V 29/83* | (2015.01) |
| *F21V 29/67* | (2015.01) |
| *G03B 15/05* | (2021.01) |
| *F21V 5/04* | (2006.01) |
| *F21V 14/02* | (2006.01) |
| *F21V 29/507* | (2015.01) |

(52) U.S. Cl.
CPC .............. *G03B 15/05* (2013.01); *F21V 5/045* (2013.01); *F21V 14/02* (2013.01); *F21V 29/83* (2015.01); *F21V 29/507* (2015.01); *G03B 2215/0521* (2013.01); *G03B 2215/0567* (2013.01)

(58) Field of Classification Search
CPC ......... G03B 15/05; F21V 29/83; F21V 9/503; F21V 29/503; F21V 29/67
See application file for complete search history.

(56) References Cited

U.S. PATENT DOCUMENTS

| | | | |
|---|---|---|---|
| 7,287,887 B2* | 10/2007 | Ohshio | ............... F21S 48/1742 362/277 |
| 2015/0036360 A1* | 2/2015 | Yamashita | .............. F21V 29/83 362/373 |
| 2017/0328535 A1* | 11/2017 | Yagi | ...................... F21S 41/663 |

FOREIGN PATENT DOCUMENTS

JP 2015028524 A 2/2015

* cited by examiner

*Primary Examiner* — Karabi Guharay
(74) *Attorney, Agent, or Firm* — Canon U.S.A., Inc. I.P. Division

(57) ABSTRACT

An illumination device includes a first light source, a first optical member configured to transmit light emitted from the first light source, a second optical member placed between the first light source and the first optical member and configured to transmit light emitted from the first light source, an air-movement mechanism configured to move air suctioned from a first space as an internal space closer to the first light source than the second optical member is and including the first light source, to a second space as a space between the first and second optical members, and a second light source different from the first light source, wherein a member included in a flow path of the air-movement mechanism is thermally connected to the second light source.

10 Claims, 6 Drawing Sheets

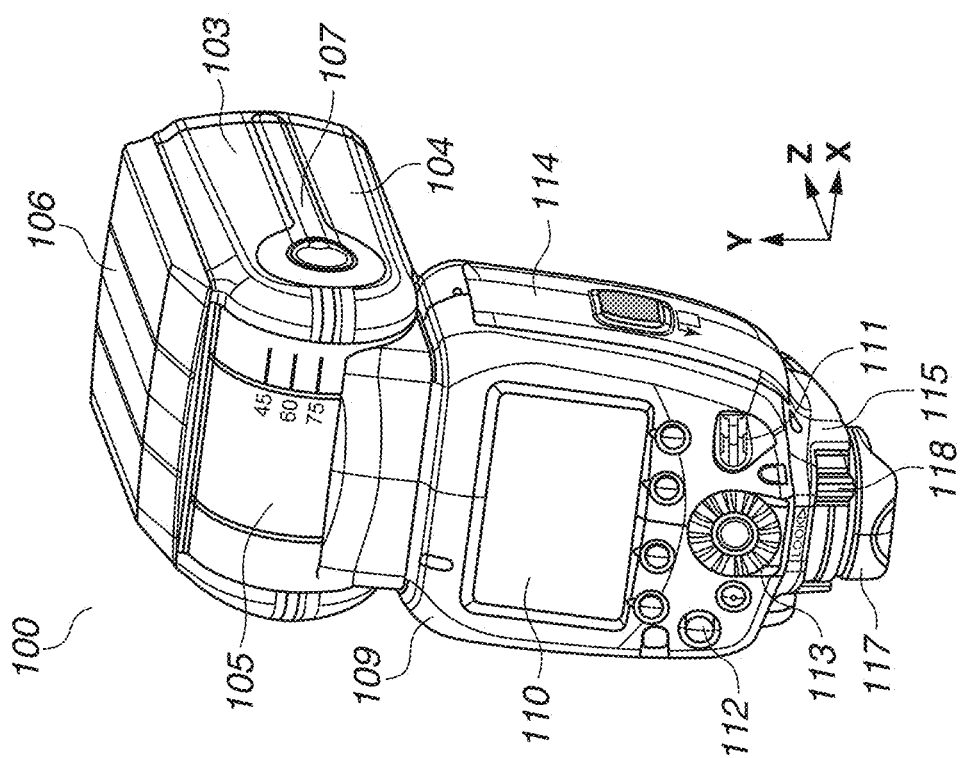
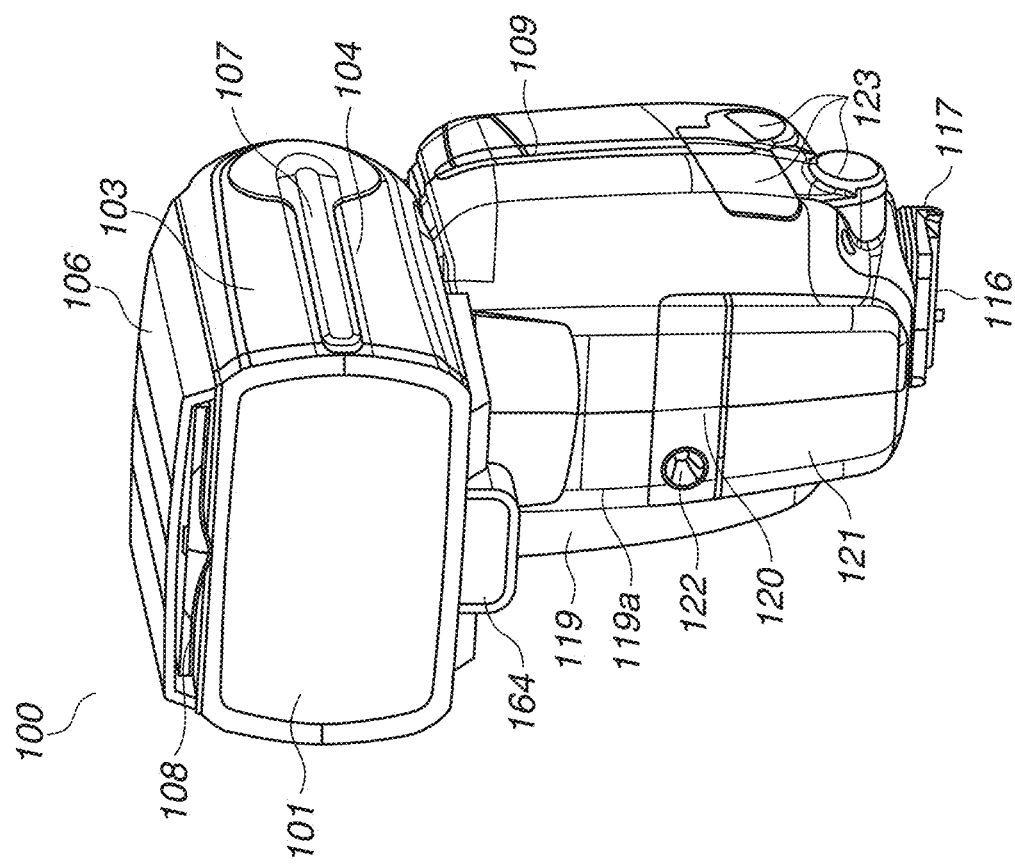

ILLUMINATION DEVICE

BACKGROUND OF THE DISCLOSURE

Field of the Disclosure

The present disclosure relates to the heat dissipation structure of an illumination device.

Description of the Related Art

In recent years, flash devices (illumination devices) on which a light-emitting diode (LED) capable of continuously lighting up is mounted, for use in a video light for capturing a moving image, a modeling light for confirming an illumination effect, and a focusing light for adjusting the focus of an imaging apparatus increase. Such a flash device requires an LED having a high luminance and a large amount of light in any of the applications of a video light, a modeling light, and a focusing light. Thus, an important issue is how to treat heat generated when the LED emits light.

For example, Japanese Patent Application Laid-Open No. 2015-028524 discusses an illumination device that transfers heat generated in a light-emitting unit to a heat dissipation member and then releases the heat through a path formed by a housing to outside.

In the technique discussed in Japanese Patent Application Laid-Open No. 2015-028524, however, heat from an LED is released through the path formed by the housing to outside, while water and foreign substances may enter the housing through the path.

SUMMARY OF THE DISCLOSURE

According to an aspect of the present disclosure, an illumination device includes a first light source, a first optical member configured to transmit light emitted from the first light source, a second optical member placed between the first light source and the first optical member and configured to transmit light emitted from the first light source, an air-movement mechanism configured to move air suctioned from a first space as an internal space closer to the first light source than the second optical member is and including the first light source, to a second space as a space between the first and second optical members, and a second light source different from the first light source, wherein a member included in a flow path of the air-movement mechanism is thermally connected to the second light source.

Further features and aspects of the present disclosure will become apparent from the following description of example embodiments with reference to the attached drawings.

BRIEF DESCRIPTION OF THE DRAWINGS

FIGS. 1A and 1B are external perspective views of a flash device according to an example embodiment of the present disclosure.

DESCRIPTION OF THE EMBODIMENTS

Figure 2:
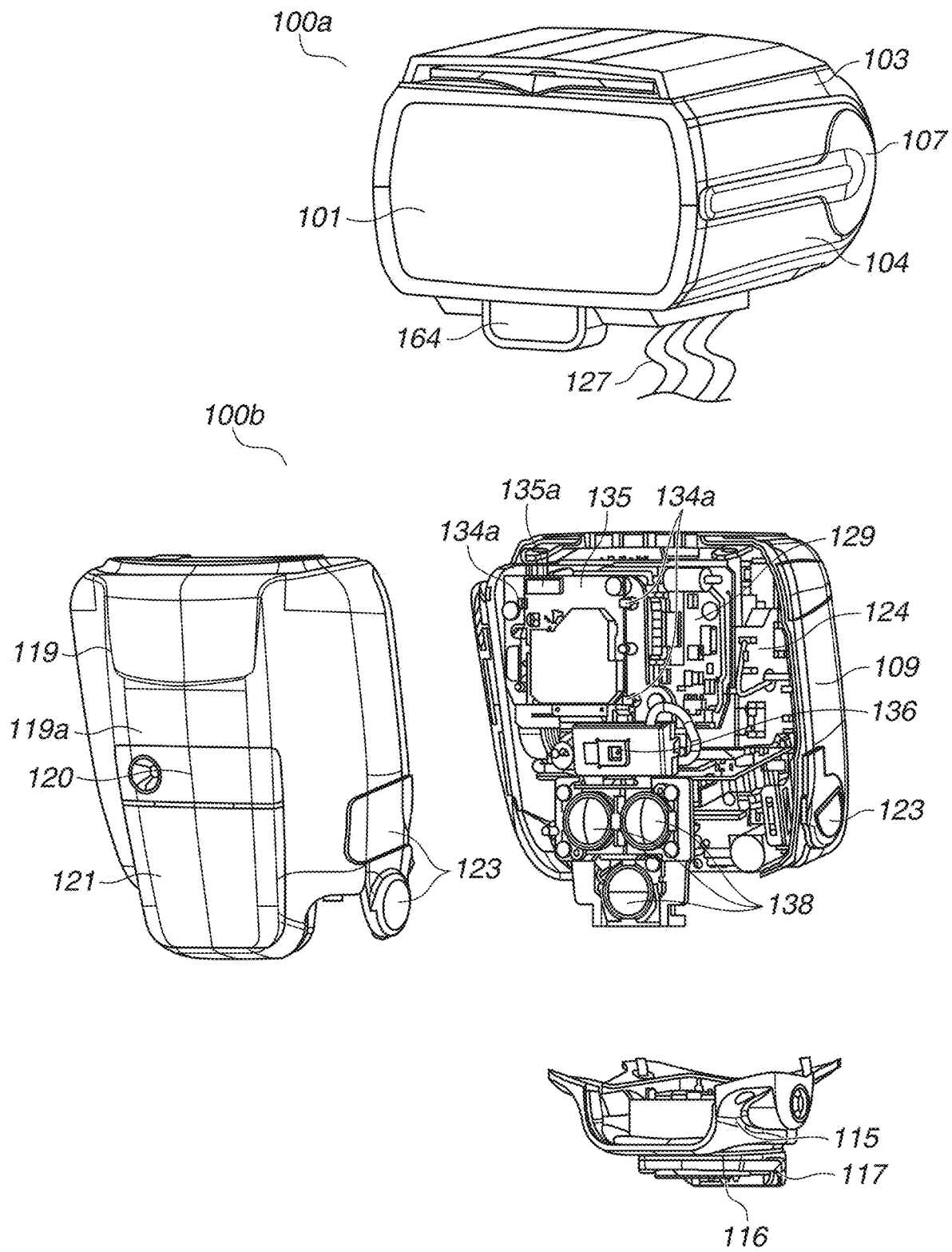
FIG. 2 is an exploded perspective view illustrating an inside of a control section according to the example embodiment of the present disclosure.

Example embodiments, features and aspects of the present disclosure will be described in detail below based on the attached drawings. In the drawings, similar members are designated by the same reference numbers, and are not redundantly described.

First, with reference to FIGS. 1A and 1B, a flash device 100, which is an illumination device according to an example embodiment of the present disclosure, is described. FIGS. 1A and 1B are external perspective views of the flash device 100 according to the present example embodiment. FIG. 1A is a view of the flash device 100 from its front surface side where an acrylic panel 101 is placed. FIG. 1B is a view of the flash device 100 from its back surface side (an operation unit side).

The flash device 100 includes two main sections, namely a light-emitting section 100a (a first housing) and a control section 100b (a second housing). The light-emitting section 100a includes a discharge tube 102 (a first light source) that illuminates an object, and light-emitting diode (LED) elements 161 (a second light source) capable of lighting up more continuously than the discharge tube 102. Further, the light-emitting section 100a has a bounce function of pivotally moving relative to the control section 100b, thereby changing the emission directions of light emitted from an acrylic panel 101 and an LED window 164. The pivotal movement may be manually performed by a user holding the light-emitting section 100a, or may be automatically performed by a motor (not illustrated). In the present example embodiment, the direction in which the light-emitting section 100a and the control section 100b are arranged is defined as the up-down direction of the flash device 100, and the light-emitting section 100a side is defined as an upper side. Then, the up-down direction in a reference state where the angle of the rotational movement of the light-emitting section 100a relative to the control section 100b is 0 degrees as illustrated in FIGS. 1A and 1B is defined as the up-down direction of the light-emitting section 100a.

The light-emitting section 100a mainly includes an upper cover 103 (a first cover), a lower cover 104 (a second cover), and a bounce case 105 having a cylindrical shape. Further, the upper cover 103 includes a wide panel cover 106 that accommodates a wide panel 108 that spreads the distribution of emitted light. The wide panel 108 is an optical member having light diffusibility for spreading light emitted from the acrylic panel 101 to a wider angle. The wide panel 108 is pulled out from the wide panel cover 106 when used, and is placed to cover a front surface of the acrylic panel 101. Alternatively, a configuration may be employed in which, as an auxiliary optical member, a catchlight sheet is placed instead of the wide panel 108 so that when the emission direction of emitted light is directed upward (in a Y-direction), the catchlight sheet reflects the emitted light, thereby providing a catchlight effect to an object. Yet alternatively, a configuration may be employed in which both the wide panel 108 and the catchlight sheet are placed. In a joining portion of the upper cover 103 and the lower cover 104, side rubber 107 is provided and functions as an anti-slip member when the user manually pivotally moves the light-emitting section 100a.

The upper cover 103 and the lower cover 104 can pivotally move in the up-down direction (a ZY plane direction) relative to the bounce case 105. The bounce case 105 can pivotally move in the horizontal direction (an XZ plane direction) relative to the control section 100b. As described above, the light-emitting section 100a is rotationally movable relative to the control section 100b and can change the emission directions of light from the discharge tube 102 and the LED elements 161. The control section 100b supports the light-emitting section 100a and controls the operation of the light-emitting section 100a.

A rear cover 109 as an exterior member is provided on aback surface side of the control section 100b. On the rear cover 109, operation units such as a display unit 110, a power switch 111, an operation button 112, and a dial 113 are placed and allow various function settings. A battery cover 114 is an openable and closable cover for loading power supply batteries 125 into the control section 100b. In a bottom cover 115 as an exterior member on a lower surface side, a leg portion 116 is included that is a connection portion to be detachably attached to an accessory shoe of a camera as an imaging apparatus (not illustrated). A drip-proof cover 117 is attached around the leg portion 116. The leg portion 116 can be fixed to the accessory shoe of the camera (not illustrated) by rotationally moving a lock lever 118. A front cover 119 is an exterior member on a front surface side of the control section 100b. In a center portion of the front cover 119, a bulge portion 119a is provided that protrudes forward from the front cover 119. In the lower half of the bulge portion 119a, an optical pulse communication light-receiving window 120 and an autofocus (AF) assist light-emitting window 121 that assists the adjustment of the focus of the camera when the luminance is low are placed. In a part of the optical pulse communication light-receiving window 120, an external light modulation light-receiving sensor 122 is included so that the flash device 100 alone can also perform light modulation other than the light modulation of the camera (not illustrated). On the opposite side of the battery cover 114 of the control section 100b, various terminal covers 123 are included. Within the various terminal covers 123, an external power supply terminal, a bracket fixing screw, and a synchronization terminal are included. In joining portions of the exterior members, drip-proof packing (not illustrated) is included and has dust-proof and drip-proof performance together with the terminal covers 123 and the drip-proof cover 117.

As described above, in the present example embodiment, the side where the bulge portion 119a of the control section 100b is provided is defined as a front surface side, the side where the display unit 110 and the various operation units are provided is defined as a back surface side, and the side where the leg portion 116 of the control section 100b is provided is defined as a lower surface side. Then, in FIGS. 1A and 1B, an X-direction corresponds to the left-right direction of the control section 100b, a Y-direction corresponds to the up-down direction of the control section 100b, and a Z-direction corresponds to the front-back direction of the control section 100b. Hereinafter, unless otherwise stated, the left-right direction, the up-down direction, and the front-back direction of the flash device 100 are equal to the left-right direction, the up-down direction, and the front-back direction, respectively, of the control section 100b.

Figure 3:
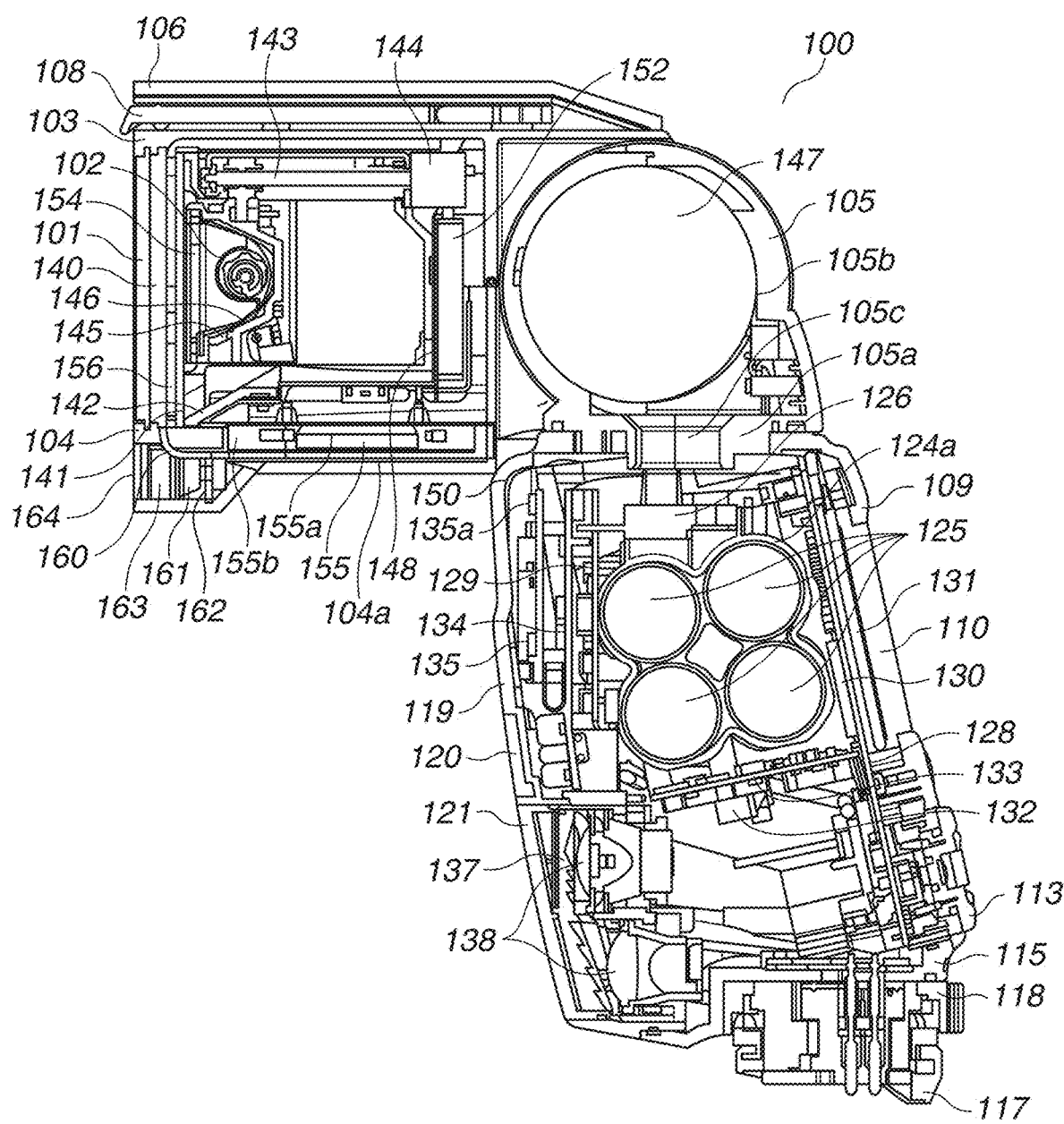
FIG. 3 is a longitudinal cross-sectional view of the flash device according to the example embodiment of the present disclosure.

Next, with reference to FIGS. 2, 3, 4A, and 4B, the internal configuration of the control section 100b and the internal configurations of the light-emitting section 100a and the bounce case 105 are described. FIG. 2 is an exploded perspective view illustrating the inside of the control section 100b from the front surface side when the front cover 119 and the bottom cover 115 are removed from the control section 100b. FIG. 3 is a cross-sectional view orthogonal to the left-right direction of the flash device 100.

In the center within the control section 100b, a battery case 124 is provided between a main substrate 128 and a sub substrate 129. In a battery accommodation portion 124a of the battery case 124, the power supply batteries 125 (four AA size batteries in the present example embodiment) are accommodated in an approximately square-shaped arrangement. Alternatively, a chargeable and dischargeable lithium-ion secondary battery may be employed. Above the battery accommodation portion 124a, a predetermined space region 126 is provided between the battery accommodation portion 124a and a shaft portion 105a for a left-right rotational movement (a rotational movement in the XZ plane) on a lower surface of the bounce case 105 that protrudes from the light-emitting section 100a. The space region 126 is provided to accommodate a wire harness 127 in a loosened state. The wire harness 127 is connected to the main substrate 128 and the sub substrate 129. At this time, if the wire harness 127 is connected in a strained state without a sufficient length, the wire harness 127 may receive a twisting force by the left-right pivotal movement of the light-emitting section 100a and become disconnected. Thus, the wire harness 127 is accommodated with sufficient looseness so as not to be influenced by the left-right pivotal movement in the space region 126.

On a back surface side, i.e., the rear cover 109 side, of the battery case 124, the main substrate 128 including a digital circuit is placed. On the main substrate 128, a central processing unit (CPU) 130 is mounted. On the main substrate 128, switch elements corresponding to the various operation members such as the power switch 111 placed on the rear cover 109 are also mounted. Inside the display unit 110, a liquid crystal display (LCD) 131 is placed. On a front surface side and a lower surface side of the battery case 124, a step-up circuit board 133 including a step-up transformer 132 and the sub substrate 129 having a light emission control circuit including a field-effect transistor (FET) (not illustrated) are attached.

On the front surface side of the battery case 124, a pedestal 134 and the sub substrate 129 are attached one on top of the other. On a front surface side of the pedestal 134, a wireless module 135 is attached by a plurality of engaging claws 134a integrally formed with the pedestal 134. On an upper end side of the wireless module 135, a wireless communication antenna 135a (a chip antenna) is mounted. To a connector (not illustrated) on a lower end side of the wireless module 135, a flexible substrate (not illustrated) linked to the main substrate 128 is connected. At a position opposed to the optical pulse communication light-receiving window 120 provided in a lower portion of the front cover 119, an optical pulse light-receiving sensor 136 is placed. Further, at positions opposed to the AF assist light-emitting window 121 across a prism 137, AF assist light units 138 are placed. The prism 137 divides a single pattern emitted from the AF assist light units 138 into a plurality of rays, and the AF assist light-emitting window 121 projects the plurality of rays (three AF assist light units 138 are provided in the present example embodiment). If the LED elements 161 can be used as a focusing light, the AF assist light units 138 do not need to be included.

To a back surface (the bounce case 105 side) of a hood 142, a head substrate 148 connected to the discharge tube 102 is attached. Wiring lines (not illustrated) connected to the head substrate 148 are guided to a capacitor accommodation portion 105*b* through a rotating portion 149 between the upper cover 103 that rotates about the center of the cylinder of the bounce case 105, and the bounce case 105. These wiring lines form the wire harness 127 with wiring lines connected to a capacitor 147. The wire harness 127 is pulled out of the light-emitting section 100*a* from a hole portion 105*c* formed in the center of the shaft portion 105*a*. To the end of the wire harness 127, a connector (not illustrated) is attached. This connector electrically connects circuits on the head substrate 148 provided within the light-emitting section 100*a* to the main substrate 128 and the sub substrate 129 provided within the control section 100*b*. As described above, the wire harness 127 electrically connects electronic components such as the discharge tube 102 and the capacitor 147 provided in the light-emitting section 100*a* to the control substrates provided in the control section 100*b*. To the end of the shaft portion 105*a* of the bounce case 105, a rotating plate 150 is attached. The rotating plate 150 has the function of restricting the left-right pivoting of the light-emitting section 100*a* to a predetermined angle. The rotating plate 150 also has the function of preventing the light-emitting section 100*a* from coming out of the control section 100*b*.

In the capacitor accommodation portion 105*b* within the bounce case 105 having a cylindrical shape, the capacitor 147 (a main capacitor) is placed. That is, the capacitor 147 is placed on a rotational axis about which the light-emitting section 100*a* is rotationally moved in the up-down direction (the Y-direction) relative to the control section 100*b*. The capacitor 147 is placed near a connection portion of the light-emitting section 100*a* and the control section 100*b*. The capacitor 147 accumulates charges for causing the discharge tube 102 to emit light. With the accumulated charges, a high voltage required for the discharge tube 102 to emit light is generated.

By applying a trigger voltage from a trigger coil 151 to the discharge tube 102, the discharge tube 102 starts discharging and emits light. The trigger coil 151 is mounted on the head substrate 148 and electrically connected to a reflective umbrella 146 by a trigger cable (not illustrated). The trigger voltage is applied from the trigger coil 151 through the reflective umbrella 146 to the discharge tube 102. On the head substrate 148, components regarding light emission, such as the trigger coil 151 and a choke coil 152 included in a light-emitting circuit, are mounted. On the head substrate 148, a connector 153 is also mounted to which the wire harness 127 is connected. The choke coil 152 is electrically connected to the capacitor 147 and the discharge tube 102 between the capacitor 147 and the discharge tube 102 and dampens a current supplied from the capacitor 147 to the discharge tube 102. This enables light emission control when flat light emission is performed, and also reduces an electrical load acting on the discharge tube 102. On the light-emitting circuit, only the minimum components for causing the discharge tube 102 to emit light need to be mounted, and not all the above components need to be mounted.

Figure 4A:
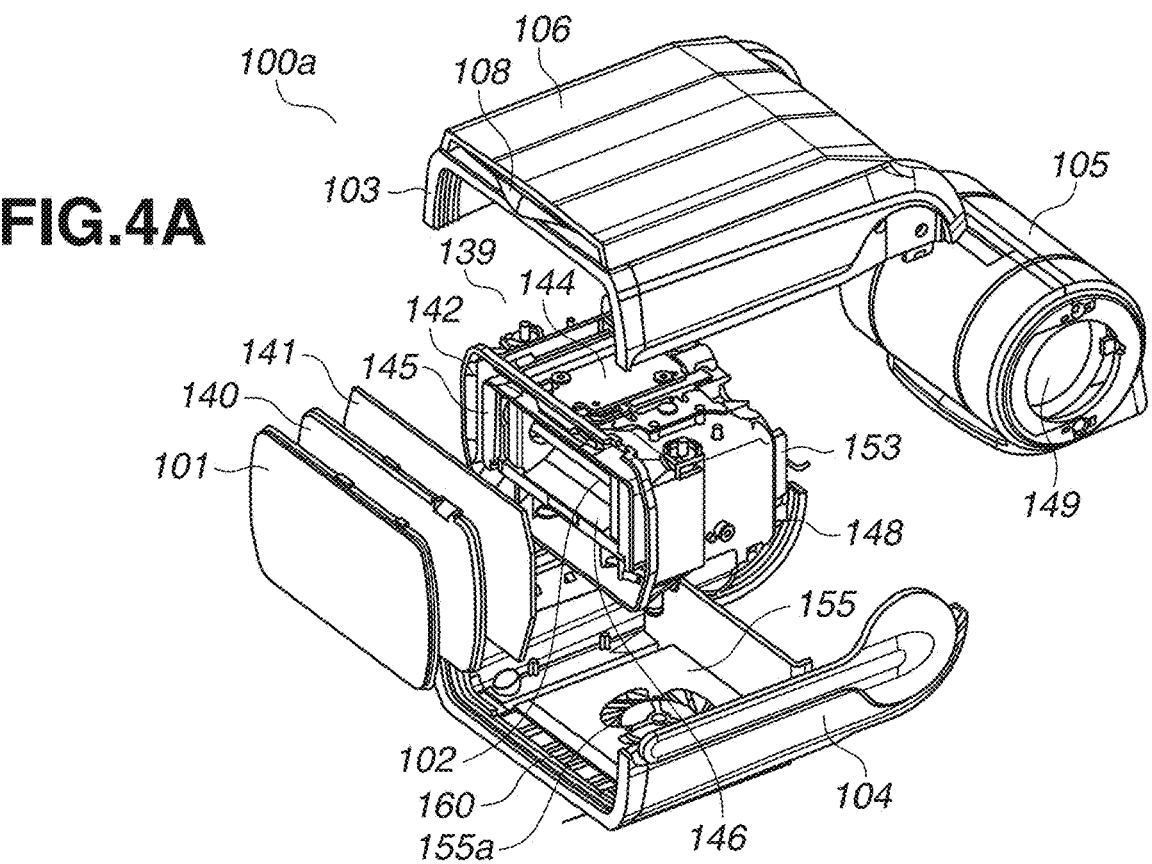
FIGS. 4A and 4B are exploded perspective views illustrating an inside of a light-emitting section according to the example embodiment of the present disclosure.
Figure 4B:
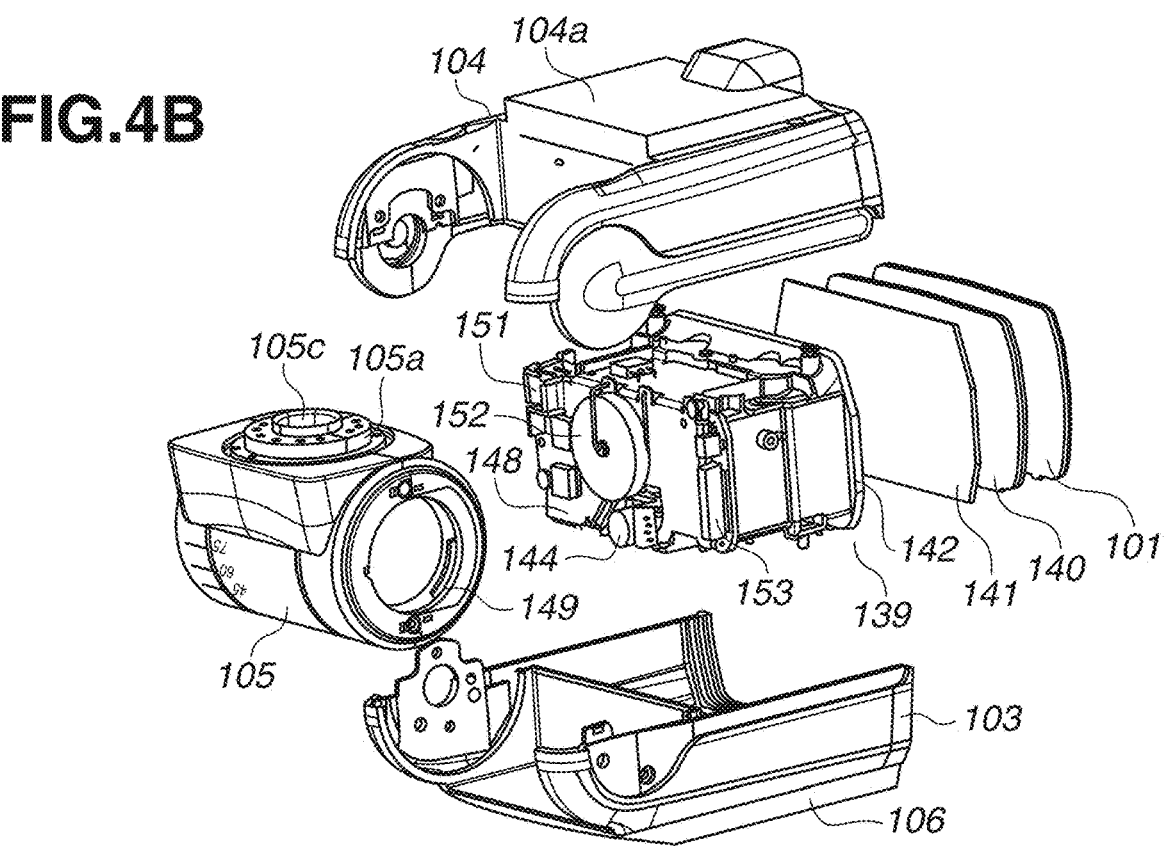

FIGS. 4A and 4B are exploded perspective views illustrating the inside of the light-emitting section 100*a* when the upper cover 103 and the lower cover 104 are removed from the light-emitting section 100*a*. FIG. 4A is a view of the light-emitting section 100*a* from its upper surface side. FIG. 4B is a view of the light-emitting section 100*a* its the lower surface side.

The flash device 100 according to the present example embodiment includes a driving mechanism for changing the emission angle of a Fresnel lens 140 as a first optical member within the acrylic panel 101, and the discharge tube 102 by changing the relative position of the discharge tube 102 in the direction of the emission optical axis of the discharge tube 102. The Fresnel lens 140 is an optical lens that refracts light emitted from the discharge tube 102 and transmits the light, thereby changing the distribution of the light. The acrylic panel 101 has the function of adjusting the distribution of the light emitted from the Fresnel lens 140, adjusting the color temperature of the light, and protecting the Fresnel lens 140 from external contact (including shock and thermal protection). The present example embodiment is described using an optical system having a two-component configuration including the acrylic panel 101 and the Fresnel lens 140. Alternatively, an optical system having a single-component configuration may be obtained by adding the function of the acrylic panel 101 to the Fresnel lens 140. A light-emitting section unit 139 included in the driving mechanism accounts for a large portion of the inside of the light-emitting section 100*a*. To an upper surface of the hood 142 as a structure of the light-emitting section unit 139, a motor unit 144 including a lead screw 143 as an actuator is attached. To a reflective umbrella holder 145, the discharge tube 102, the reflective umbrella 146 that reflects light forward from the discharge tube 102, and front glass 154 that blocks heat transferred from the discharge tube 102 to the Fresnel lens 140 are attached. The reflective umbrella 146 covers from an upper side through a back side to a lower side of the discharge tube 102 and reflects light emitted backward and in the up-down direction from the discharge tube 102, toward the Fresnel lens 140. The reflective umbrella holder 145 changes the relative distance between the Fresnel lens 140 and the discharge tube 102 in conjunction with the rotation of the lead screw 143. This changes the light distribution angle of emitted light. In the present example embodiment, a flash device having a configuration in which the light distribution angle of emitted light is changed by changing the distances from the discharge tube 102 and the reflective umbrella 146 to the Fresnel lens 140 is used. Alternatively, a configuration may be employed in which the light distribution angle of emitted light is changed by changing the distance between upper and lower reflective surfaces of the reflective umbrella 146. In a case where light is not reflected in the emission direction of the light-emitting section unit 139 by the reflective umbrella 146, the hood 142 diffusely reflects the light in the emission direction of the light-emitting section unit 139. Thus, to efficiently reflect light in the emission direction of the light-emitting section unit 139, the hood 142 has such a shape that the closer to the Fresnel lens 140 an opening on a plane orthogonal to the optical axis of light emitted from the light-emitting section unit 139 is, the larger the opening is. As described above, the hood 142 can be said to be a reflective member that surrounds the discharge tube 102 with an opening in a part of the reflective member and reflects a part of light emitted from the discharge tube 102 in the direction of the opening.

Fresnel protective glass 141 as a second optical member is placed between the discharge tube 102 and the Fresnel lens 140 with a predetermined space from the Fresnel lens 140 and transmits light emitted from the discharge tube 102. This protects the Fresnel lens 140 from the heat of the discharge tube 102 generated by light emission and also forms a flow path 156 that allows air from a blower fan 155 to pass. Incidentally, the front glass 154 also has a function similar to that of the Fresnel protective glass 141 in that the Fresnel lens 140 is protected by blocking heat transferred from the discharge tube 102 to the Fresnel lens 140. The front glass 154, however, keeps heat from the discharge tube 102 near the front glass 154 by the front glass 154 and the reflective umbrella holder 145 and therefore is likely to apply a thermal load to the discharge tube 102. To dissipate more heat from the discharge tube 102, the front glass 154 may not be provided.

The blower fan 155 is placed in a fan accommodation portion 104a of the lower cover 104 and thermally connected to the lower cover 104. The blower fan 155 is electrically connected to the head substrate 148 by a wire harness (not illustrated). The blower fan 155 is driven by the CPU 130 of the control section 100b controlling the rotation of the blower fan 155 based on a pulse-width modulation (PWM) signal via the head substrate 148. An air intake portion 155a of the blower fan 155 faces the light-emitting section unit 139 side and takes in air heated by the discharge tube 102. Then, the air passes through the flow path 156 formed by the Fresnel lens 140 and the Fresnel protective glass 141 via a flow path component member 160 that bends exhaust air from the blower fan 155 in a direction approximately orthogonal to the optical axis of the discharge tube 102, thereby cooling the Fresnel lens 140. The air that has come out of the flow path 156 is bent to the motor unit 144 side and discharged and flows into the light-emitting section unit 139.

That is, the blower fan 155 functions as a air-movement mechanism for sending air suctioned from a first space as an internal space closer to the first light source than the second optical member is and including the first light source, to a second space as a space between the first and second optical members.

Figure 5A:
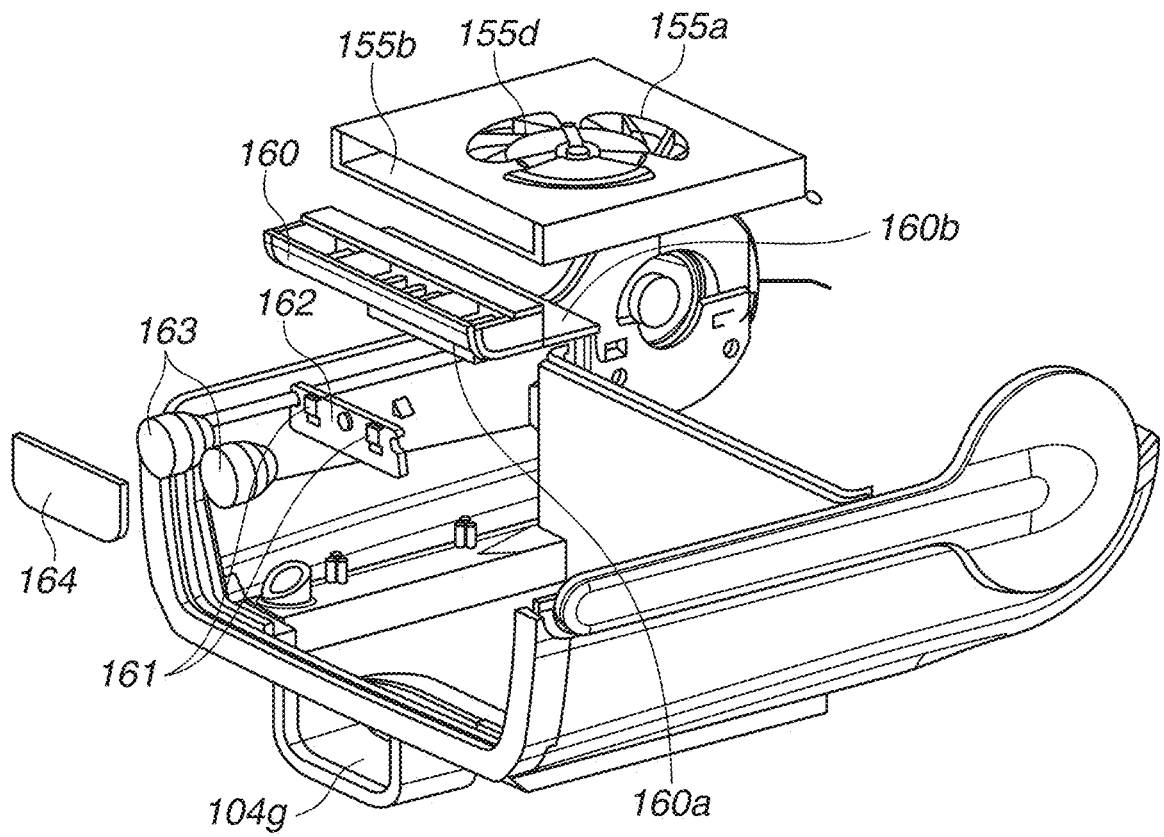
FIGS. 5A and 5B are perspective views illustrating configurations of a blower fan and a light-emitting diode (LED) light unit according to the example embodiment of the present disclosure.
Figure 5B:
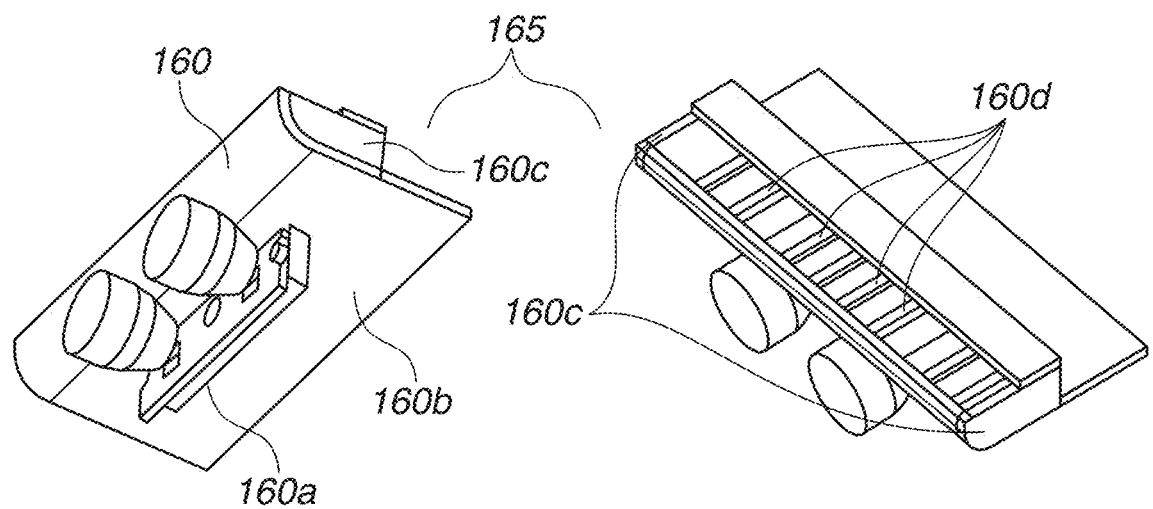

Next, with reference to FIGS. 5A and 5B, the configuration of an LED light unit 165 is described. FIGS. 5A and 5B are perspective views illustrating the configurations of the blower fan 155 and the LED light unit 165. To the fan accommodation portion 104a of the lower cover 104, the blower fan 155 is fixed via an elastic member (not illustrated) to absorb vibration. The blower fan 155 is thermally connected to the lower cover 104. To an air exhaust portion 155b of the blower fan 155, the flow path component member 160 is attached. At a position outside the flow path of the flow path component member 160, an LED fixing portion 160a is provided. To the LED fixing portion 160a of the flow path component member 160, an LED substrate 162 on which the LED elements 161 are mounted is fixed with a screw (not illustrated) or bonded with an elastic member (not illustrated). Heat generated with the light emission of the LED elements 161 is transferred via the LED fixing portion 160a to the flow path component member 160. A connection portion 160b is thermally connected to the blower fan 155 via an elastic member (not illustrated). In the flow path component member 160, standing walls 160c are provided to efficiently hit exhaust air from the blower fan 155 against a portion of the Fresnel lens 140 that receives heat from the discharge tube 102.

The LED substrate 162 is a substrate composed of a metal such as aluminum to enhance heat conductivity. The LED substrate 162, however, may be composed of a material other than a metal or composed of a composite material of a metal and another material so long as desired heat conductivity is obtained. Heat generated with the light emission of the LED elements 161 is transferred via the LED substrate 162 to the flow path component member 160. The flow path component member 160 is molded from a metal such as aluminum or another material and efficiently diffuses the heat from the LED elements 161 to the entirety of the flow path component member 160. The diffused heat is conducted from the flow path component member connection portion 160b to the blower fan 155 and transferred to the lower cover 104 via an elastic member (not illustrated). The lower cover 104 is in contact with external air and therefore can dissipate the transferred heat to the external air. Since exhaust air from the blower fan 155 passes through the flow path component member 160, the flow path component member 160 is forcibly cooled by the blower fan 155. Thus, it is possible to prevent an excessive rise in the temperature of the LED elements 161. The standing walls 160c of the flow path component member 160 also contribute to increasing the surface area that exhaust air from the blower fan 155 hits to forcibly cool heat from the LED elements 161. Between the standing walls 160c on both sides (within the flow path 156), cooling fins 160d may be provided that extend in a direction parallel to the air-movement direction to enhance the cooling effect by increasing the surface area.

In front of the LED elements 161, LED lenses 163 are placed that control the distribution of light beams emitted from the LED elements 161. Further, in front of the LED lenses 163, the LED window 164 is placed. Alternatively, the LED lenses 163 may be covered by the acrylic panel 101 without using the LED window 164.

Figure 6:
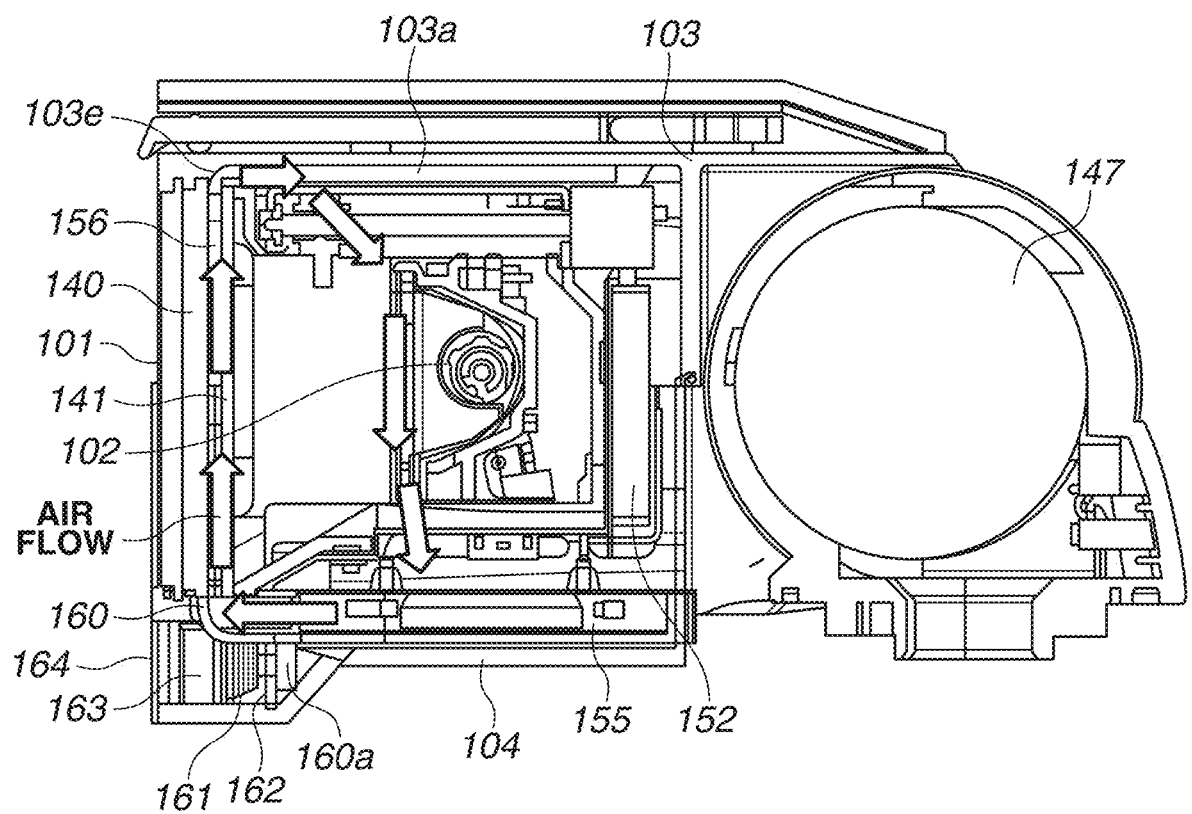
FIG. 6 is a cross-sectional view illustrating a flow of main air in the light-emitting section according to the example embodiment of the present disclosure.

Next, with reference to FIG. 6, the cooling structure of the light-emitting section 100a according to the present example embodiment is described. FIG. 6 is a cross-sectional view illustrating the flow of main air in the light-emitting section 100a. Arrows in FIG. 6 indicate the direction in which main air flows.

As described above, the blower fan 155 is thermally connected to the lower cover 104. When taking in air warmed up by the discharge tube 102, the blower fan 155 transfers heat to the lower cover 104, thereby cooling down the taken-in air. The lower cover 104 is in contact with external air and therefore can efficiently cool down the taken-in air while dissipating the transferred heat to the external air. A fan driving substrate (not illustrated) is electrically connected to the head substrate 148 in the light-emitting section 100a by a wire harness (not illustrated) and the blower fan 155 is driven by supplying power and based on a driving control signal. Blades 155d rotate at high speed, whereby the blower fan 155 takes in air heated by the light emission of the discharge tube 102 from the air intake portion 155a. Then, the blower fan 155 increases the flow rate of the air and sends the air from the air exhaust portion (blast port) 155b. The longitudinal direction of the air exhaust portion 155b and the longitudinal direction of the discharge tube 102 are the same, whereby it is possible to efficiently send air to a region in the Fresnel lens 140 where the temperature is likely to rise due to the influence of the discharge tube 102.

Exhaust air from the blower fan 155 passes through the flow path 156 formed by the Fresnel lens 140 and the Fresnel protective glass 141, via the flow path component member 160. When the air passes through the flow path 156, the air is allowed to pass in the state where the flow rate of the air is maintained, whereby it is possible to effectively cool the Fresnel lens 140, the temperature of which has risen due to heat generated with the light emission of the discharge tube 102.

Even if the blower fan 155 takes in air heated by the light emission of the discharge tube 102, the lower cover 104 can dissipate heat as described above. The Fresnel lens 140 heated by the heat and the light of the discharge tube 102 is much higher in temperature than air sent from the blower fan 155. Thus, the temperature difference required to cool the Fresnel lens 140 is sufficiently large, and the Fresnel lens 140 can be cooled. The flow path component member 160 bends the flow of air sent from the blower fan 155 in an approximately orthogonal direction, whereby it is possible to make the entire configuration of the light-emitting section 100a small while forming the flow path 156 in a direction orthogonal to the longitudinal direction of the discharge tube 102.

Air that has flowed out of the flow path 156 flows into an outflow path 103a while smoothly changing its moving direction from the up direction (the Y-direction) to the back direction (the Z-direction) with an outflow port 103e formed in the upper cover 103. The air that has flowed into the outflow path 103a passes within the hood 142 and is taken in by the blower fan 155 while drawing in heat from the discharge tube 102 again.

Even if light is continuously emitted by cooling the discharge tube 102, the LED elements 161, and the Fresnel lens 140 while circulating air within the flash device 100 as described above, it is possible to protect the discharge tube 102 and the Fresnel lens 140. Further, the blower fan 155 that cools the discharge tube 102 can simultaneously cool heat from the LED elements 161 using the flow path component member 160 as a heat sink. Thus, since a heat sink dedicated to the cooling of the LED elements 161 does not need to be separately used, it is possible to reduce the number of components. Further, in the above configuration, air is circulated within a closed space. Thus, this configuration can be achieved while maintaining dust-proof and drip-proof performance. In the present example embodiment, a description has been given of an example of a configuration in which air is circulated within the flash device 100 using the blower fan 155. Alternatively, a mechanism for circulating air within the flash device 100 may use another fan or a pump.

As described above, according to the present example embodiment, in the flash device 100, it is possible to protect the discharge tube 102, the LED elements 161, and the Fresnel lens 140 from heat generated by the light emission of the discharge tube 102 and the LED elements 161.

The above example embodiments are merely typical examples and can be modified and changed in various manners when the present disclosure is carried out. For example, a configuration may be employed in which a light source different from the discharge tube 102 or the LED elements 161 is used in a video light, a modeling light, or a focusing light.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2019-093735, filed May 17, 2019, which is hereby incorporated by reference herein in its entirety.

What is claimed is:

1. An illumination device comprising:
   a first light source configured to include a discharge tube;
   a first optical member configured to transmit light emitted from the first light source;
   a second optical member placed between the first light source and the first optical member and configured to transmit the light emitted from the first light source;
   an air-movement mechanism configured to be arranged between a first space and a second space and move air between the first space and the second space, wherein the first space is an inner space of the illumination device that is nearer to the first light source than the second optical member, and the second space is a space between the first optical member and the second optical member; and
   a second light source different from the first light source, wherein a member included in a flow path of the air-movement mechanism is thermally connected to the second light source.

2. The illumination device according to claim 1, wherein, in the member included in the flow path, a cooling fin extending in a direction parallel to an air-movement direction of the air-movement mechanism is provided within the flow path.

3. The illumination device according to claim 1, wherein, in the member included in the flow path, a fixing portion configured to fix the second light source is provided outside the flow path.

4. The illumination device according to claim 1, wherein the second light source is a light-emitting diode (LED).

5. The illumination device according to claim 1, wherein the first optical member is an optical lens configured to change a distribution of the light emitted from the first light source.

6. The illumination device according to claim 1, wherein the second optical member is placed at a predetermined distance from the first optical member in a direction of an emission optical axis of the first light source.

7. The illumination device according to claim 1, further comprising a driving mechanism configured to change a relative position between the first light source and the first optical member in a direction of an emission optical axis of the first light source,
   wherein even in a case where the driving mechanism changes the relative position between the first light source and the first optical member in the direction of the emission optical axis, a relative position between the first and second optical members in the direction of the emission optical axis does not change.

8. The illumination device according to claim 1, wherein air moved to the second space by the air-movement mechanism flows in a direction orthogonal to a longitudinal direction of the first light source.

9. The illumination device according to claim 1, wherein a blast port of the air-movement mechanism is placed such that a longitudinal direction of the blast port is the same as a longitudinal direction of the first light source.

10. The illumination device according to claim 1, further comprising:
    a control section attachable to and detachable from an imaging apparatus; and
    a light-emitting section rotationally movable relative to the control section,
    wherein the first and second light sources are provided in the light-emitting section.

* * * * *